(12) United States Patent
Wang et al.

(10) Patent No.: US 12,108,472 B2
(45) Date of Patent: Oct. 1, 2024

(54) DUAL CONNECTIVITY WITH SECONDARY CELL-USER EQUIPMENT

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 400 days.

(21) Appl. No.: 17/610,652

(22) PCT Filed: May 27, 2020

(86) PCT No.: PCT/US2020/034725
§ 371 (c)(1),
(2) Date: Nov. 11, 2021

(87) PCT Pub. No.: WO2020/243186
PCT Pub. Date: Dec. 3, 2020

(65) Prior Publication Data
US 2022/0217798 A1    Jul. 7, 2022

Related U.S. Application Data

(60) Provisional application No. 62/854,946, filed on May 30, 2019.

(51) Int. Cl.
*H04W 76/15* (2018.01)
*H04W 72/1263* (2023.01)
(Continued)

(52) U.S. Cl.
CPC ....... *H04W 76/15* (2018.02); *H04W 72/1263* (2013.01); *H04W 72/23* (2023.01); *H04W 88/04* (2013.01); *H04W 92/10* (2013.01)

(58) Field of Classification Search
CPC . H04W 76/15; H04W 72/1263; H04W 72/23; H04W 88/04; H04W 92/10;
(Continued)

(56) References Cited

U.S. PATENT DOCUMENTS 6,665,521 B1   12/2003 Gorday et al.
10,218,422 B2   2/2019 Raghavan et al.
(Continued)

FOREIGN PATENT DOCUMENTS

CN   107852658    3/2018
CN   109076383   12/2018
(Continued)

OTHER PUBLICATIONS

"Foreign Office Action", CN Application No. 202080037860.6, Sep. 21, 2023, 10 pages.
(Continued)

*Primary Examiner* — Kiet Tang
(74) *Attorney, Agent, or Firm* — Colby Nipper PLLC

(57) ABSTRACT

Techniques and apparatuses are described for enabling dual connectivity with secondary cell-user equipment. In some aspects, a base station (121) serving as a primary cell forms a base station-user equipment dual connectivity (BUDC) group (410) by configuring a user equipment (UE, 111) as a secondary cell-user equipment (SC-UE, 420) to provide a secondary cell. The base station (121) or SC-UE (420) can then add other UEs (112, 113, 114) to the BUDC group (410) thereby enabling dual connectivity for the UEs through the primary cell or secondary cell provided by the SC-UE (420). In some cases, the SC-UE (420) schedules resources of an air interface (302) by which the other UEs to communicate with the SC-UE (420). By so doing, the SC-UE (420) can communicate data with the other UEs (112, 113, 114) of the BUDC group (410) without communicating through a base station (121, 122), which decreases latency of communications between the UEs (111-114) of the BUDC group (410).

20 Claims, 10 Drawing Sheets

(51) Int. Cl.
*H04W 72/23* (2023.01)
*H04W 88/04* (2009.01)
*H04W 92/10* (2009.01)

(58) Field of Classification Search
CPC ..... H04W 76/14; H04W 76/40; H04W 8/005; H04B 7/0617
See application file for complete search history.

(56) References Cited

U.S. PATENT DOCUMENTS

| | | | |
|---|---|---|---|
| 2009/0016232 | A1 | 1/2009 | Kwon et al. |
| 2011/0158117 | A1 | 6/2011 | Ho et al. |
| 2015/0195795 | A1 | 7/2015 | Loehr et al. |
| 2016/0014836 | A1* | 1/2016 | Pinheiro ............ H04B 7/0617 370/329 |
| 2016/0323832 | A1 | 11/2016 | Love et al. |
| 2016/0360563 | A1 | 12/2016 | Lecroart et al. |
| 2017/0078333 | A1 | 3/2017 | Tevlin |
| 2017/0126306 | A1 | 5/2017 | Kim et al. |
| 2018/0092067 | A1 | 3/2018 | Liu et al. |
| 2018/0098370 | A1* | 4/2018 | Bangolae ............ H04W 88/04 |
| 2018/0279110 | A1* | 9/2018 | Sen .................. H04W 8/005 |
| 2019/0081657 | A1 | 3/2019 | Zeng et al. |
| 2020/0154442 | A1 | 5/2020 | Zhou |

FOREIGN PATENT DOCUMENTS

| | | |
|---|---|---|
| WO | 2017055157 | 4/2017 |
| WO | 2017055482 | 4/2017 |
| WO | 2017133646 | 8/2017 |
| WO | 2017148173 | 9/2017 |
| WO | 2018130115 | 7/2018 |
| WO | 2020243186 | 12/2020 |

OTHER PUBLICATIONS

"3GPP TS 24.501 V16.3.0", 3GPP TS 24.501 version 16.3.0, Dec. 2019, 645 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"International Preliminary Report on Patentability", PCT Application No. PCT/US2020/034725, Aug. 3, 2021, 18 pages.

"International Search Report and Written Opinion", PCT Application No. PCT/US2020/034725, Nov. 10, 2020, 15 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.

"Third Generation Partnership Project; Technical Specification Group Services and System Aspects; Service requirements for the 5G system; Stage 1", 3GPP TS 22.261 version 16.10.0 Release 16, Dec. 2019, 72 pages.

"UE Overheating for EN-DC", 3GPP R2-1802414, UE overheating for EN-DC, in 3GPP TSG-RAN WG2 Meeting #101, Apple Inc., Mar. 2, 2018, 3 pages.

Aboba, et al., "Extensible Authentication Protocol (EAP)", RFC Editor; Retrieved from https://www.rfc-editor.org/info/rfc3748, Jun. 2004, 67 pages.

Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.

Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.

Wu, "Handling Overheating in a Wireless—Communication Device", Technical Disclosure Commons; Retrieved from https://www.tdcommons.org/dpubs_series/2343, Jul. 12, 2019, 22 pages.

* cited by examiner

DUAL CONNECTIVITY WITH SECONDARY CELL-USER EQUIPMENT

RELATED APPLICATION(S)

This application is a national stage entry of International Application No. PCT/US2020/034725, filed May 27, 2020, which in turn claims priority to U.S. Provisional Application 62/854,946, filed May 30, 2019, the disclosures of which are incorporated herein by reference in their entireties.

Background

Generally, a provider of a wireless network manages wireless communications over the wireless network. For example, a base station manages wireless connections with user equipment (UE) that are connected to the wireless network for data or network access. The base station typically determines configurations for the wireless connections, such as bandwidth and timing for a wireless connection by which a UE accesses the wireless network.

The latency of the network links between the UE, base station, and other network entities can slow communication through the network as data traverses each network entity before reaching a destination. For example, data communicated between two UEs may travel from one UE through a base station and core network before reaching another base station and the other UE, resulting in network latency. Several solutions have been developed to improve network latency. However, with recent advancements in wireless communication systems, such as Fifth Generation New Radio (5G NR), new approaches may be available.

SUMMARY

This document describes techniques and apparatuses for dual connectivity with secondary cell-user equipment. In some aspects, the techniques enable a base station as a primary cell to form base station-user equipment dual connectivity (BUDC) groups in which multiple user equipment (UEs) of the BUDC group can communicate through a secondary cell provided by one of the UEs of the BUDC group. The apparatuses and techniques described herein overcome challenges that a UE may encounter when communicating data with other UEs through base stations or other network entities (e.g., core network). For example, such data communication through an access network and/or core network may increase latency of data communications, some of which are time sensitive (e.g., sensor data or telemetry information) for optimal application or system performance.

In some aspects, a base station serving as a primary cell forms a base station-user equipment dual connectivity (BUDC) group by configuring a user equipment as a secondary cell-user equipment (SC-UE) to provide a secondary cell. The base station and/or SC-UE can then add other UEs to the BUDC group to enable the other UEs to communicate with the SC-UE through the secondary cell. In some cases, the SC-UE schedules resources of an air interface by which the other UEs communicate with the SC-UE. By so doing, the SC-UE can communicate or relay data directly with the other UEs of the BUDC group without communicating through a base station or core network, which decreases latency of communications between the UEs of the BUDC group.

The details of one or more implementations of dual connectivity with secondary cell-user equipment are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of dual connectivity with secondary cell-user equipment are described below. The use of the same reference numbers in different instances in the description and the figures indicate similar elements.

DETAILED DESCRIPTION

Figure 1:
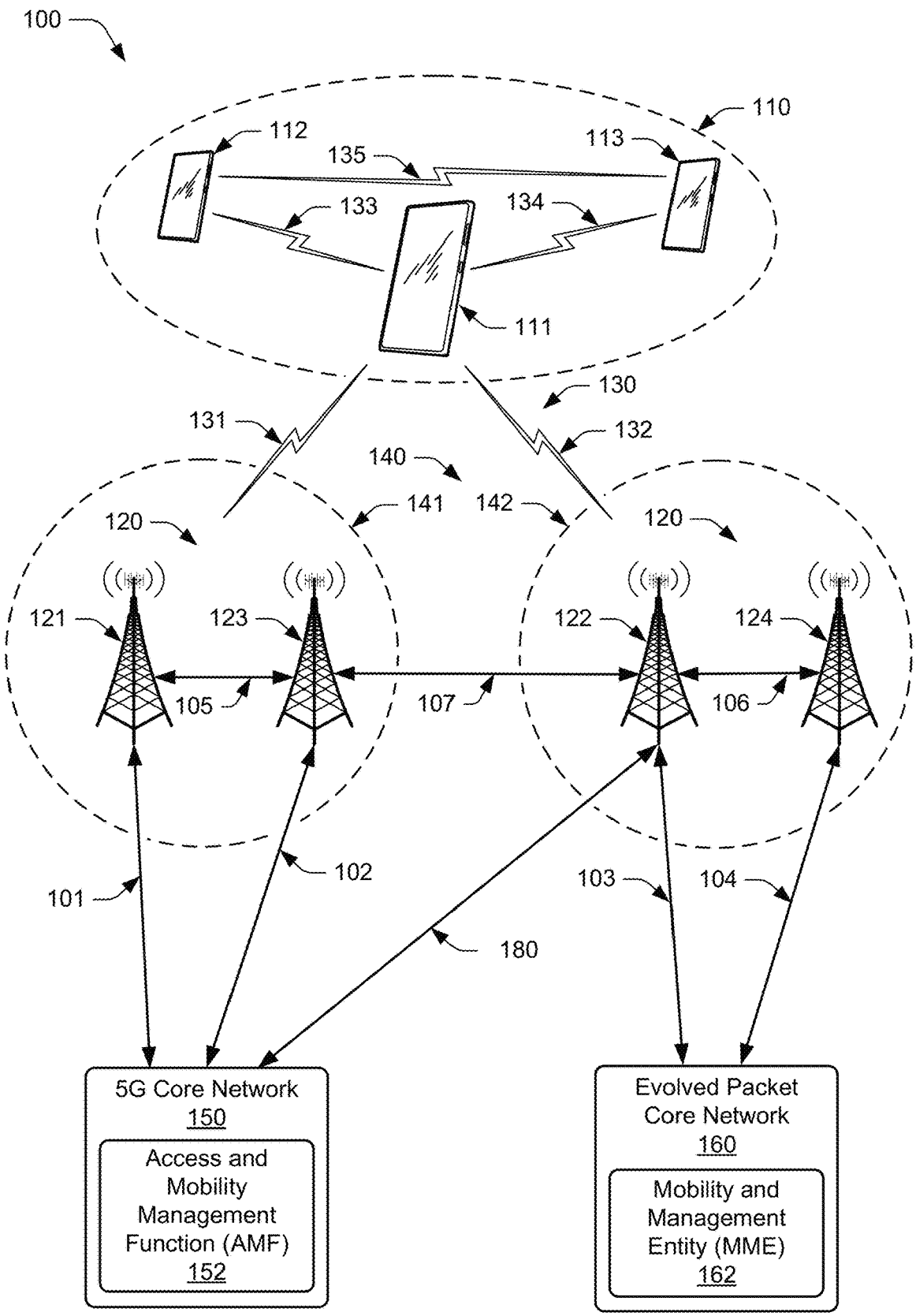
FIG. 1 illustrates an example operating environment in which various aspects of dual connectivity with secondary cell-user equipment can be implemented.

In conventional wireless communication systems, latency of the network links between the UE, base station, and other network entities can slow communication through the network as data traverses various links between each network entity before reaching a destination. For example, data communicated between two UEs may travel from one UE through a base station and core network before reaching the other UE, resulting in network latency. For time sensitive communications, such as telemetry information, sensor data, or other real-time application data, this network-related latency can degrade performance of the applications that rely on the timing of these communications.

This document describes aspects of dual connectivity with secondary cell-user equipment, which may be implemented to form a base station-user equipment dual connectivity BUDC group or BUDC set between multiple UEs. Generally, the BUDC group includes at least two UEs that communicate through a secondary connection (e.g., a radio access technology (RAT) connection), such as to communicate data packets through a secondary cell provided by one of the UEs. Because the data is communicated with or through the secondary cell-UE of the BUDC group (thereby avoiding base stations and core network), the secondary cell enables low latency communication among the UEs of the BUDC group.

For example, a base station serving as a primary cell can form a BUDC group by configuring a user equipment as a secondary cell-user equipment (SC-UE) to provide a secondary cell. The base station can also grant or assign resources of an air interface for use by the SC-UE to schedule communications of UEs assigned to the BUDC group. The base station and/or SC-UE can then add other UEs to the BUDC group to enable the other UEs to communicate with the SC-UE through the secondary cell. By so doing, the SC-UE can communicate data directly with the other UEs of the BUDC group without communicating through a base station, which decreases latency of communications between the UEs of the BUDC group. As another example, consider UEs configured as respective vehicle computing systems can be added to a BUDC group to enable low latency communication among the UEs. Using the secondary cell of the BUDC group, the UEs can communicate directly (e.g., with the SC-UE or relayed through the SC-UE) to share time sensitive information, such as sensor data or telemetry information, without the latency typically associated with the primary cell and other network entities of a wireless network.

In some aspects, a method performed by a UE configured as a secondary cell-user equipment (SC-UE) for a BUDC group includes receiving, from a base station serving as a primary cell, configuration information for the BUDC group. The method also includes admitting another UE associated with the base station to the BUDC group. The UE schedules, for the other UE, resources of an air interface for communication in a secondary cell provided by the UE for the BUDC group. The UE then communicates data with the other UE of the BUDC group using the scheduled resources of the air interface for communication in the secondary cell.

In other aspects, a method performed by a base station acting as a primary cell to establish a BUDC group for multiple UEs includes selecting a first UE to serve as a SC-UE for the BUDC group. The method also includes granting resources of an air interface to the first UE for use by UEs of the BUDC group to communicate in a secondary cell provided by the first UE. The base station then configures a second UE for addition of the second UE to the BUDC group effective to enable the second UE to communicate with the first UE through the secondary cell. The method further includes communicating, as the primary cell, control-plane information or data with the first UE or the second UE of the BUDC group.

In further aspects, a first user equipment includes a radio frequency (RF) transceiver, as well as a processor and memory system coupled to the RF transceiver. The memory system stores instructions of the first UE that are executable by the processor to direct the first UE to receive, from a base station acting as a primary cell, configuration information for a BUDC group. The first UE is also directed to admit a second UE associated with the base station to the BUDC group. The first UE then schedules, for the second UE, resources of an air interface for communication in a secondary cell provided by the first UE for the BUDC group. The instructions are also executable to communicate data with the second UE of the BUDC group using the scheduled resources of the air interface for communication in the secondary cell.

Example Environments

FIG. 1 illustrates an example operating environment 100 in which various aspects of dual connectivity with secondary cell-user equipment can be implemented. Generally, the example environment 100 includes multiple user equipment 110 (UE 110), illustrated as UE 111, UE 112, and UE 113 of a base station-user equipment dual connectivity (BUDC) group. Each UE 110 can communicate with base stations 120 (illustrated as base stations 121, 122, 123, and 124) through wireless communication links 130 (wireless link 130), illustrated as wireless links 131 and 132. Each UE 110 in a BUDC group can also communicate with other UE 110 of the BUDC group through one or more wireless communication links which are illustrated as wireless links 133, 134, and 135. In some aspects, the wireless links 133, 134, or 135 are implemented as a radio access technology connection (e.g., Fifth Generation (5G) or Sixth Generation (6G)) through licensed, unlicensed, or shared frequency spectrum, such as Citizens Band Radio Service (CBRS). The wireless links 133, 134, and 135 may enable data-plane (or user-plane) communications among the UE 110 of the BUDC group, such as data packet traffic or communication across packet data convergence protocol (PDCP), radio link control (RLC), and medium access control (MAC) layers of the user-plane (e.g., up to layer-2).

Alternately or additionally, a UE 110 of a BUDC group can also communicate with another UE 110 through other wireless connections, such as local wireless network connections (not shown). The local wireless network connections of the UEs 110 can be implemented as any suitable type of wireless connection or link, such as a millimeter wave (mmWave) link, sub-millimeter wave (sub-mmWave) link, free space optical (FSO) link, wireless local access network (WLAN), wireless personal area network (WPAN), near-field communication (NFC), Bluetooth™, ZigBee™, radar, lidar, sonar, ultrasonic, or the like. In some aspects, the UE 110 of the BUDC group can discover, identify, or add a candidate UE 110 to the BUDC by communicating with the candidate UE through a local wireless network connection (e.g., WLAN or Bluetooth™).

In this example, the UE 110 is implemented as a smartphone. Although illustrated as a smartphone, the UE 110 may be implemented as any suitable computing or electronic device, such as a smart watch, mobile communication device, modem, cellular phone, gaming device, navigation device, media device, laptop computer, desktop computer, tablet computer, smart appliance, vehicle-based communication system, vehicle telemetry system, traffic monitoring/control equipment, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a primary cell, macrocell, microcell, small cell, picocell, or the like, or any combination thereof.

In some aspects, a base station 120 selects UEs 110 and provides configuration information to the UEs 110 in order to establish the BUDC group. The base station can also manage membership of the BUDC group (e.g., add or remove UEs) or grant resources to the BUDC group to enable wireless links between the UEs 110. For example, the base station 120 can assign or grant (e.g., semi-persistent scheduling) resources of an air interface to a secondary cell-user equipment (SC-UE) of the BUDC that provides a secondary cell for communication among the UEs of the BUDC group. The SC-UE can then schedule, from the assigned resources, uplink or downlink resources for the UEs of the BUDC group to communicate within the secondary cell.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), Sixth Generation (6G), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 collectively form a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 connect to an Evolved Packet Core 160 (EPC 160). Alternately or additionally, the base station 122 may connect to both the 5GC 150 and EPC 160 networks.

The base stations 121 and 123 connect, at 101 and 102 respectively, to the 5GC 150 through an NG2 interface for control-plane signaling and using an NG3 interface for user-plane data communications. The base stations 122 and 124 connect, at 103 and 104 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 105 and the base stations 122 and 124 communicate through an X2 interface at 106 to exchange user-plane and control-plane data. The interface or link at 105 or 106 between the base stations 120 can be implemented as any suitable type of link, such as a mmWave link, a sub-mmWave link, or a FSO link. At least one base station 120 (base station 121 and/or base station 123) in the NR RAN 141 can communicate with at least one base station 120 (base station 122 and/or base station 124) in the E-UTRAN 142 using an Xn interface at 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
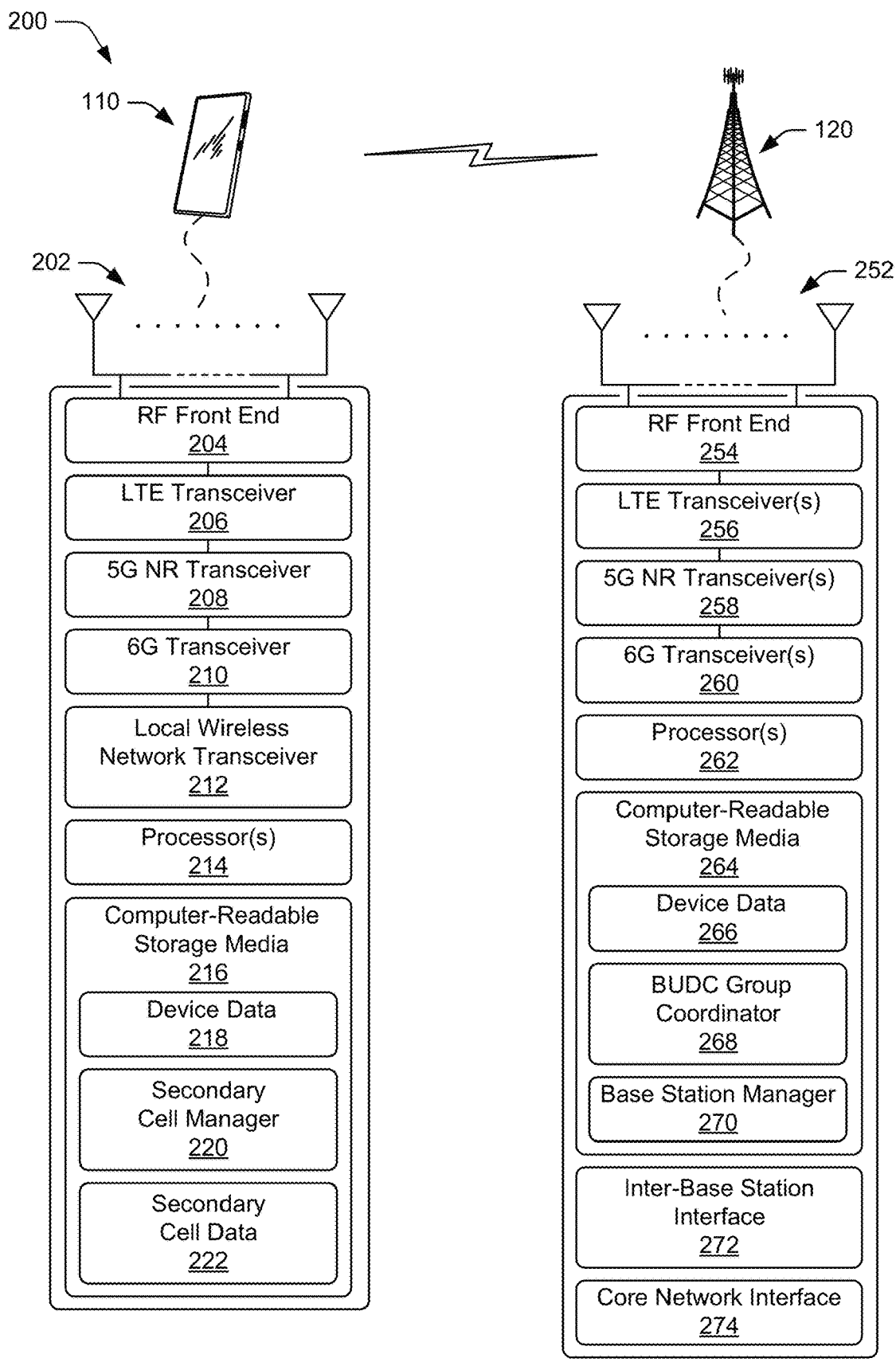
FIG. 2 illustrates an example device diagram of network entities that can implement various aspects of dual connectivity with secondary cell-user equipment.

FIG. 2 illustrates an example device diagram 200 of the user equipment 110 and base stations 120. Each of the UEs 110 is capable of serving as an SC-UE which will be described further. Generally, the device diagram 200 describes network entities that can implement various aspects of dual connectivity with secondary cell-user equipment. FIG. 2 shows respective instances of the UEs 110 and the base stations 120. The UEs 110 or the base stations 120 may include additional functions and interfaces that are omitted from FIG. 2 for the sake visual brevity. The UE 110 includes antennas 202, a radio frequency front end 204 (RF front end 204), and radio-frequency transceivers that include an LTE transceiver 206, a 5G NR transceiver 208, and a 6G transceiver 210 for communicating with other UEs 110, base stations 120 in the 5G RAN 141, and/or the E-UTRAN 142. The UE 110 includes one or more additional transceivers (e.g., local wireless network transceiver 212) for communicating over one or more local wireless networks (e.g., WLAN, WPAN, Bluetooth™, NFC, Wi-Fi-Direct, IEEE 802.15.4, ZigBee, Thread, mmWave, sub-mmWave, FSO, radar, lidar, sonar, ultrasonic) with at least one other UE of the BUDC group. The RF front end 204 of the UE 110 can couple or connect the LTE transceiver 206, the 5G NR transceiver 208, the 6G transceiver 210, and the local wireless network transceiver 212 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands). In addition, the RF front end 204 can be tuned to, and/or be tunable to, one or more frequency bands defined and implemented by the local wireless network transceiver 212 to support transmission and reception of communications with other UEs in the BUDC group over a local wireless network.

The UE 110 includes sensors (not shown) that can be implemented to detect various properties such as temperature, orientation, acceleration, proximity, distance, supplied power, power usage, battery state, or the like. As such, the sensors of the UE 110 may include any one or a combination of accelerometers, gyros, depth sensors, distance sensors, temperature sensors, thermistors, battery sensors, and power usage sensors. In various aspects, the UE 110 can collect and share data (e.g., vehicle telemetry) from sensors with another UE of the BUDC group, such as a secondary cell-user equipment that is configured to provide the secondary cell for the BUDC group.

The UE 110 also includes processor(s) 214 and computer-readable storage media 216 (CRM 216). The processor 214 may be a single core processor or a multiple core processor implemented with a homogenous or heterogenous core structure. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

In aspects of dual connectivity with secondary cell-user equipment, the CRM 216 of the UE 110 may also include a secondary cell manager 220 and secondary cell data 222. Alternately or additionally, the secondary cell manager 220 may be implemented in whole or part as hardware logic or circuitry integrated with or separate from other components of the UE 110. Generally, the secondary cell manager 220 of the UE 110 can form or manage a BUDC group of UEs 110 for which the UE 110 provides a secondary cell. A base station 120, serving a primary cell to which the UE 110 is associated, can assign or grant the secondary cell manager 220 resources of an air interface for use in the secondary cell. The secondary cell manager 220 can then schedule the resources of the air interface for use by the UEs 110 of the BUDC group to communicate in the secondary cell. In aspects, secondary cell-user equipment facilitates data-plane communication for the UEs 110 of the BUDC group through this secondary cell.

The secondary cell data 222 may include data received from other UEs 110 of the BUDC group, which may be transmitted to the base station 120 or another UE 110 of the BUDC group. For example, a UE 110 serving as a secondary cell-user equipment can receive, aggregate, forward, and/or route data packets among the UEs 110 of the BUDC group through the secondary cell to enable low latency communication. With respect to the primary cell, the base station 120 provides control-plane signaling or information and data-plane (or user-plane) communication to one or more of the UEs through a connection with the primary cell. Alternately or additionally, the secondary cell manager 220 may use the local wireless network transceiver 212 to discover or add other UEs to the BUDC group. The implementations and uses of the secondary cell manager 220 vary and are described throughout the disclosure.

Aspects and functionalities of the UE 110 may be managed by operating system controls presented through an application programming interface (API). In some aspects, the secondary cell manager 220 accesses an API or an API service of the UE 110 to control aspects and functionalities of the user equipment or transceivers thereof. For example, the secondary cell manager 220 can access or utilize the LTE transceiver 206, 5G NR transceiver 208, 6G transceiver 210, or local wireless network transceiver 212 to coordinate with a base station 120 or other UEs 110 to form and manage a BUDC group for which the UE 110 provides a secondary cell for low latency communication. The CRM 216 may also include a communication manager (not shown) to manage or provide an interface for communicative functions of the UE 110. The communication manager may also be implemented in whole or part as hardware logic or circuitry integrated with or separate from other components of the UE 110. In at least some aspects, the communication manager configures the RF front end 204, the LTE transceiver 206, the 5G NR transceiver 208, 6G transceiver 210, and/or the local wireless network transceiver 212 to implement the techniques of dual connectivity with secondary cell-user equipment as described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and the 6G transceivers 260 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, the 5G NR transceivers 258, and/or the 6G transceivers 260. Additionally, the antennas 252, the RF front end 254, the LTE transceivers 256, the 5G NR transceivers 258, and/or 6G transceivers 260 may be configured to support beamforming, such as Massive-MIMO, for the transmission and reception of communications with any UE 110 in a BUDC group through a primary cell (e.g., cell provided by the base station 120).

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the UE 110.

In aspects, the CRM 264 of the base station 120 also includes a base station-user equipment dual connectivity (BUDC) group coordinator 268 for forming and managing BUDC groups of UEs 110. Alternately or additionally, the BUDC group coordinator 268 may be implemented in whole or part as hardware logic or circuitry integrated with or separate from other components of the base station 120. Generally, the BUDC group coordinator 268 enables the base station 120 to establish a BUDC group of UEs 110, manage resources allocated to the BUDC group for a secondary cell, and manage UE membership of the BUDC group, such as by adding or removing UEs 110 from the BUDC group (or secondary cell). For example, the BUDC group coordinator can send layer-3 messages to the SC-UE or a potential UE group member to configure, add, or remove that specific UE into or from the secondary cell of the BUDC group.

The BUDC group coordinator 268 of the base station 120 may also enable or configure a local wireless network connection between the UEs 110 of the BUDC group, such as to facilitate sharing of BUDC group information, encryption keys, resource scheduling information, or the like. For example, the BUDC group coordinator 268 may configure a local wireless network connection that is available for multiple UEs 110 of the BUDC group and then provide an indication of the configuration (e.g., channel, frequency, or network identifier) to at least one of the UEs 110. By so doing, a UE acting as a SC-UE can coordinate resources or access to the secondary cell of the BUDC group through local wireless network connections with the other UEs.

CRM 264 also includes a base station manager 270. Alternately or additionally, the base station manager 270 may be implemented in whole or part as hardware logic or circuitry integrated with or separate from other components of the base stations 120. In at least some aspects, the base station manager 270 configures the LTE transceivers 256, 5G NR transceivers 258, and 6G transceiver 260 for communication with the UE 110, as well as communication with a core network. The base stations 120 include an inter-base station interface 272, such as an Xn and/or X2 interface, which the base station manager 270 configures to exchange user-plane and control-plane data between another base station 120, to manage the communication of the base stations 120 with the UE 110. The base stations 120 include a core network interface 274 that the base station manager 270 configures to exchange user-plane and control-plane data with core network functions and/or entities.

Figure 3:
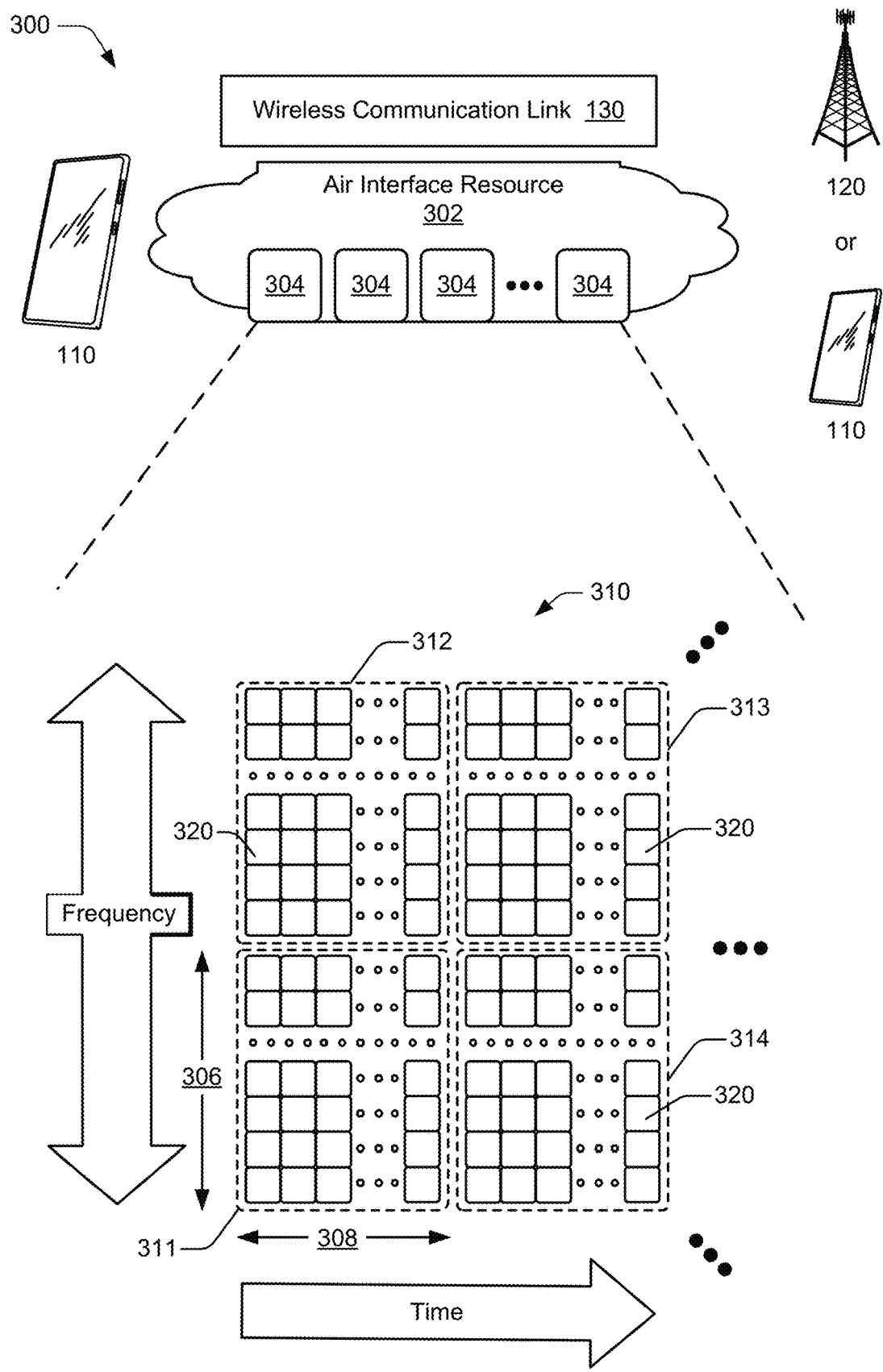
FIG. 3 illustrates an example air interface resource that extends between user equipment and/or a base station and with which various aspects of dual connectivity with secondary cell-user equipment can be implemented.

FIG. 3 illustrates an air interface resource at 300 that extends between user equipment and/or a base station through which various aspects dual connectivity with secondary cell-user equipment can be implemented. The air interface 302 may utilize licensed, unlicensed, or shared license radio spectrum (e.g., CBRS), in multiple frequency bands, to enable wireless links between UEs (secondary cell) or with a base station (primary cell) in accordance with 5G, 6G, or other communication standards. In aspects, a base station may grant or allocate a set of resources (e.g., through semi-persistent scheduling) to a SC-UE to be used for communications of a BUDC group secondary cell. For example, a SC-UE providing a secondary cell can schedule resources for other UEs of the BUDC group. Accordingly, granted resources or scheduled resources described herein may refer to frequency, time, or units of resources for an air interface, such as the air interface 302 described with reference to FIG. 3.

The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. In aspects of dual connectivity, an SC-UE may also schedule resources of the air interface for UEs of the BUDC group for communication in a secondary cell. Alternately or additionally, a base station can provide control-plane signaling to configure and manage wireless links of the secondary cell. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, user equipment 110 (one of which is shown) are communicating with the base stations 120 (one of which is shown, e.g., primary cell) or another user equipment 110 (e.g., secondary cell) through access provided by portions of the air interface resource 302. The base station manager 270 or secondary cell manager 220 (shown in FIG. 2) may determine a respective data-rate, type of information, or amount of information (e.g., data or control information) to be communicated (e.g., transmitted) by the user equipment 110. For example, the base station manager 270 (e.g. for the primary cell) or secondary cell manager 220 (e.g., for the secondary cell) can determine that each user equipment 110 is to transmit at a different respective data rate or transmit a different respective amount of information. The base station manager 270 or secondary cell manager 220 then allocates one or more resource blocks 310 to user equipment 110 of the BUDC group based on the determined data rate or amount of information.

Additionally, or in the alternative to block-level resource grants, the base station manager 270 or secondary cell manager 220 may allocate resource units at an element-level. Thus, the base station manager 270 may allocate one or more resource elements 320 or individual subcarriers to different user equipment 110. By so doing, one resource block 310 can be allocated to facilitate network access for multiple user equipment 110. Accordingly, the base station manager 270 or secondary cell manager 220 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 270 or secondary cell manager 220 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 270 or secondary cell manager 220 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

Base Station-User Equipment Dual Connectivity Group

Figure 4:
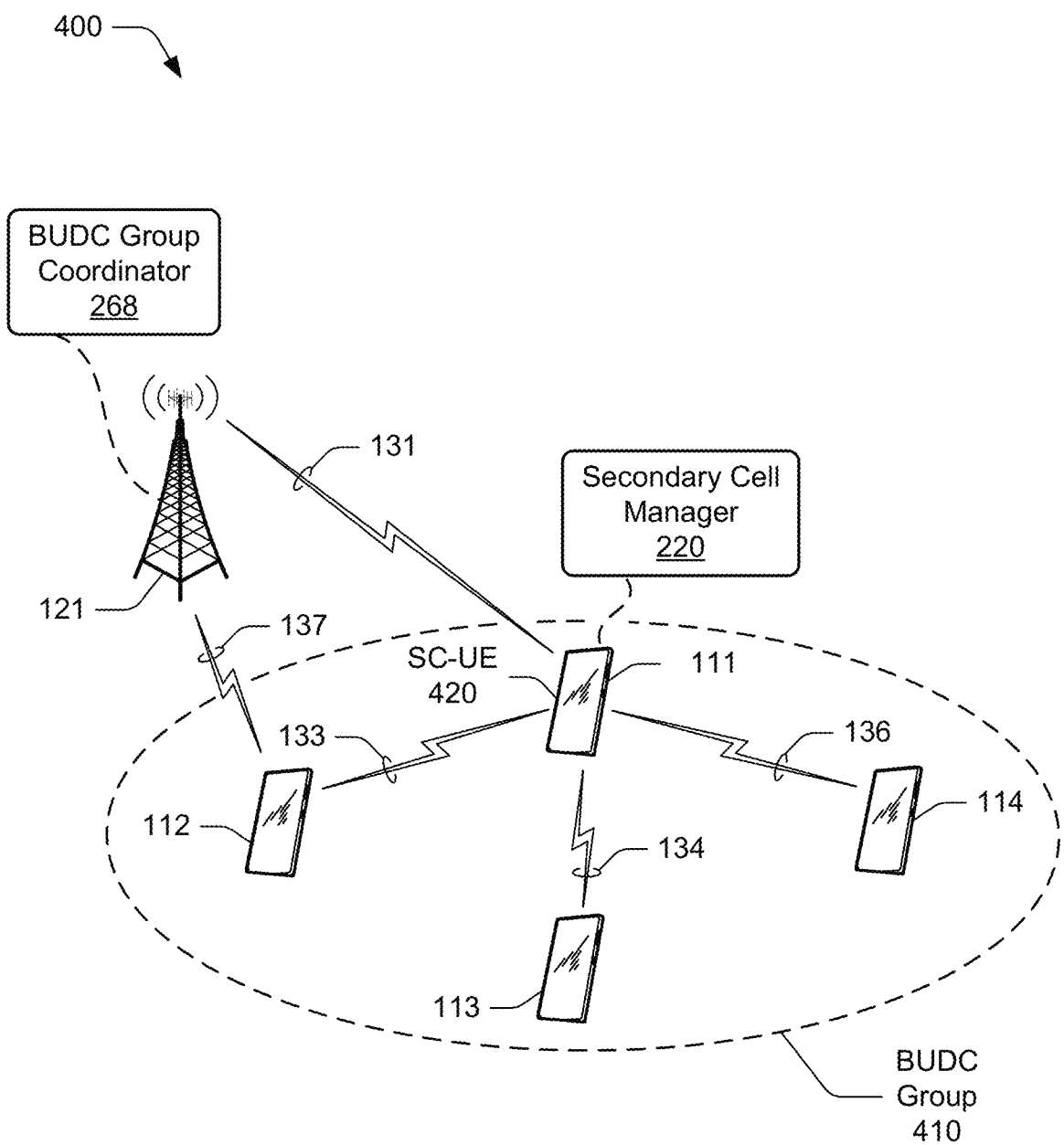
FIG. 4 illustrates an example environment in which a base station-user equipment dual connectivity group is implemented in accordance with one or more aspects.

FIG. 4 illustrates an example environment at 400 in which a base station-user equipment dual connectivity (BUDC) group 410 is implemented in accordance with various aspects. In this example, connection with a radio access network is provided by the base station 121 as a primary cell and respective connections with other UEs are provided by a SC-UE 420 acting as a secondary cell. In other words, each of the UEs may have dual connectivity to the radio access network through the base station 121 (or another base station) as a primary cell (or master cell) and/or to other UEs of the BUDC group 410 through the SC-UE 420 as the secondary cell.

In this example, assume that base station 121, as a primary cell, manages UEs 111 through 114 and maintains respective wireless links 131 and 137 of the primary cell to enable connection with the radio access network (not all primary cell connections are shown). To form the BUDC group 410, the BUDC group coordinator 268 selects the UE 111 as the SC-UE 420 for the BUDC group. The BUDC group coordinator 268 of the base station 121 can then provide an SPS grant of resources to the SC-UE 420 for communication with other UEs 110 of the BUDC group 410. For example, the SC-UE 420 can schedule the granted resources to subordinate UEs 110 of the BUDC group 410 for uplink or downlink data traffic in the secondary cell of the SC-UE 420. By so doing, the SC-UE 420 can communicate data directly with the other UEs 110 of the BUDC group without communicating through the base station 121, which decreases latency of communications among the UEs of the BUDC group. Using the secondary cell of the BUDC group, the UEs 110 can communicate directly (e.g., with the SC-UE or relayed through the SC-UE) to share time sensitive information, such as sensor data or telemetry information, without the latency typically associated with the primary cell and other network entities of a wireless network.

In some aspects of dual connectivity, the secondary cell manager 220 of the UE 111 can communicate with other UEs 110 of the BUDC in the secondary cell through the data-plane or layer-2 messages. As such, the base station 121 may provide control-plane signaling or information for respective connections to support dual connectivity with the primary cell of the base station 121 and secondary cell implemented by an SC-UE of the BUDC group. Accordingly, the base station 121 and secondary cell manager 220 of the UE 111 may negotiate or coordinate when adding, removing, or managing other UEs 110 of the BUDC group.

Figure 5A:
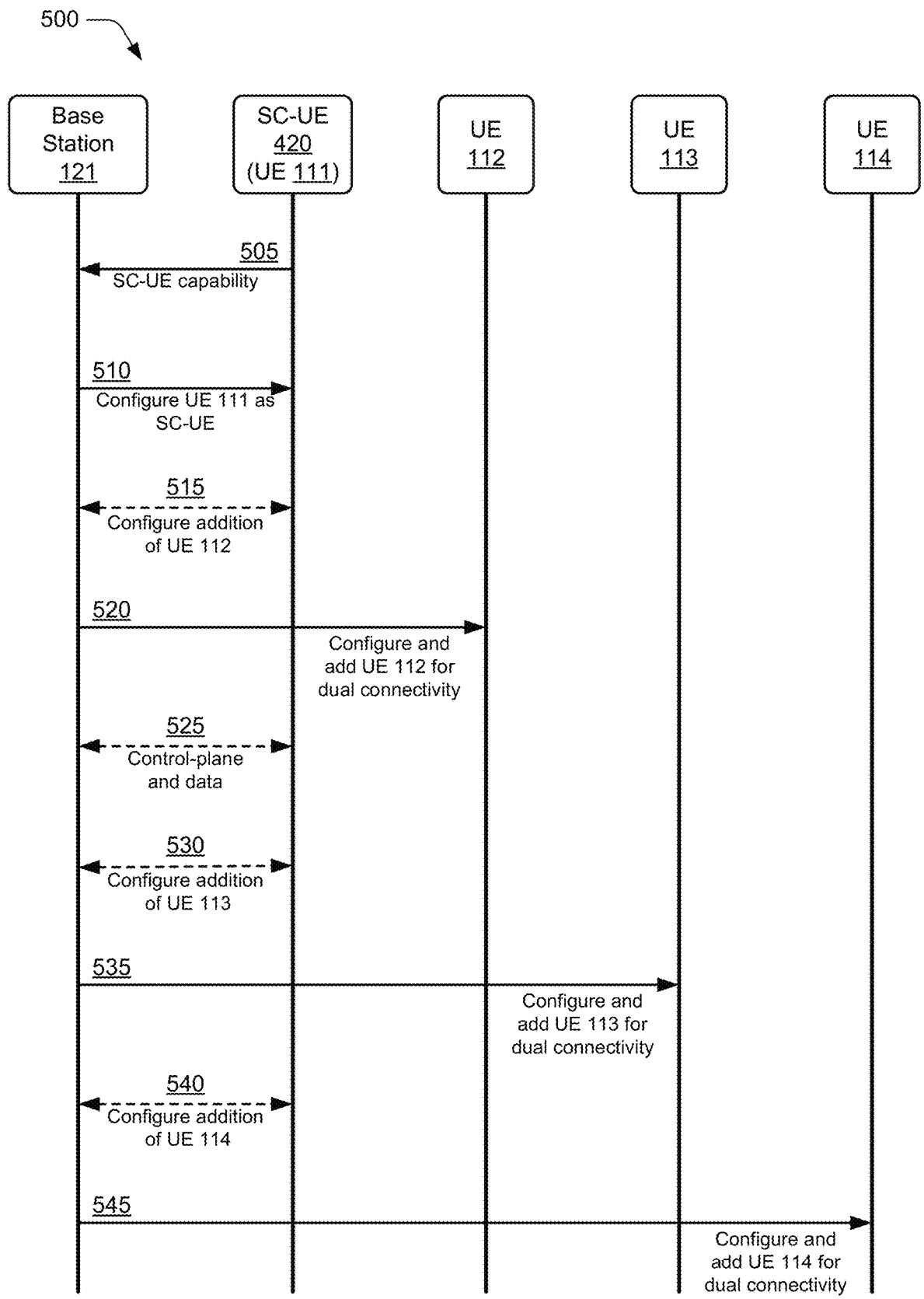
FIGS. 5A and 5B illustrate an example of data and control transactions between a base station and user equipment of a base station-user equipment dual connectivity group in accordance with one or more aspects.
Figure 5B:
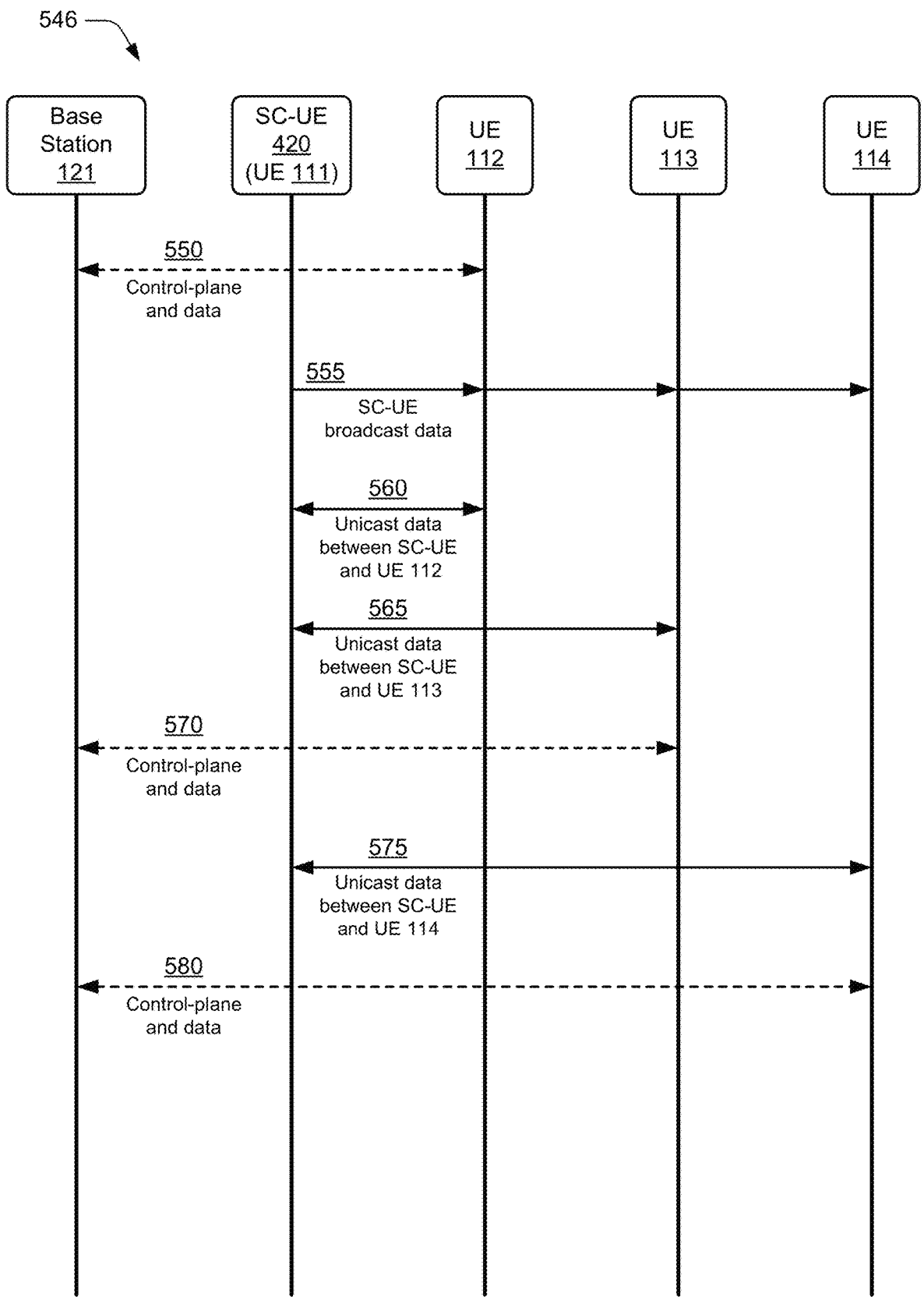

FIGS. 5A and 5B illustrate an example of data and control transactions at 500 between a base station and user equipment in accordance with aspects of dual connectivity with secondary cell-user equipment. The base station 121 and the UEs 111 through 114 may be implemented similar to the entities described with reference to FIGS. 1-4. Generally, the transactions of FIGS. 5A and 5B are described in the context of the environment of FIG. 4 in which a base station 121 and SC-UE 420 provide dual connectivity through a primary cell and secondary cell, respectively. As such, the base station 121 and UE 111, configured as the SC-UE 420, may coordinate to form a BUDC group 410 in which the UEs 111 through 114 can communicate with the base station 121 or through the SC-UE 420 for low latency data communications.

At 505, the UE 111 provides an indication to the base station 121 of capabilities to act or assume the role of SC-UE for a BUDC group 410. The indication of capabilities may include an indication of any one or more of an available battery power, available processing power, available memory for BUDC group data, and/or communication capabilities, such as a transceiver configuration or radio capabilities.

At 510, the base station 121 configures the UE 111 as the SC-UE 420 for the BUDC group 410. The base station 121 may also grant resources of an air interface to the SC-UE 420 for the BUDC group, such as through a semi-persistent scheduling grant or assignment of the resources. In some cases, the base station 121 sends a layer-3 message to configure the SC-UE 420 of the BUDC group. Alternately or additionally, the base station 121 can provide an encryption key for use by the UEs of the BUDC group for secure communications in a secondary cell.

At 515, the base station 121 configures or negotiates, with the SC-UE 420, the addition of UE 112 to the BUDC group of the SC-UE. The base station can select the UE 112 for the BUDC group based on one or more of a use profile of the UE (e.g., vehicle-based, sensor-enabled, user-based, and so on), an application of the UE (e.g., application layer communications with other UEs), a location of the UE, a proximity of the UE relative to the SC-UE, and/or a mobility state (e.g., high-mobility, medium-mobility, low-mobility, or normal-mobility state) of the UE. The base station can send a message to the SC-UE requesting addition of the UE 112 to the BUDC group, which the SC-UE may accept or decline, such as when available power or processing resources are constrained or insufficient to support SC-UE duties. Here, assume that the SC-UE accepts admission of the UE 112 to the BUDC group.

At 520, the base station 121 configures the UE 112 for the BUDC group 410 and adds the UE 112 to the BUDC group for dual connectivity. In some aspects, the base station 121 sends a layer-3 (e.g., Service Data Adaptation Protocol layer) message to the UE 112 to direct or request the UE to join the BUDC group. At 525, the base station 121 and the SC-UE 420 exchange control-plane information or user-plane data through the primary cell of the base station 121. As noted, the base station 121 can provide control-plane signaling and user-plane data for UEs of the BUDC group as the primary cell, and the SC-UE 420 can provide user-plane data communication for the UEs of the BUDC group as the secondary cell.

At 530, the base station 121 configures or negotiates, with the SC-UE 420, the addition of UE 113 to the BUDC group (or secondary cell) of the SC-UE. As described herein, the base station 121 can select UE 113 for addition to the BUDC group and request that the SC-UE accept the addition of the UE 113 to the BUDC group. At 535, the base station 121 configures the UE 113 for the BUDC group 410 and adds the UE 113 to the BUDC group for dual connectivity. The base station 121 can send a layer-3 message to the UE 113 to configure the UE 113 and/or direct the UE to join the BUDC group.

At 540, the base station 121 configures or negotiates, with the SC-UE 420, the addition of UE 114 to the BUDC group (or secondary cell) of the SC-UE. The base station 121 can select UE 114 for addition to the BUDC group and request that the SC-UE accept the addition of the UE 114 to the BUDC group. At 545, the base station 121 configures the UE 114 for the BUDC group 410 and adds the UE 114 to the BUDC group for dual connectivity. The base station 121 can send a layer-2 or layer-3 message to the UE 114 to configure the UE 114 and/or direct the UE to join the BUDC group.

Continuing to 546 of FIG. 5B, the base station 121 and the UE 112 of the BUDC group exchange control-plane information or data through the primary cell of the base station 121 at 550. As noted, the base station 121 can provide control-plane signaling and user-plane data for UEs of the BUDC group as the primary cell. At 555, the SC-UE 420 broadcasts data to the member UEs 110 of the BUDC group, which in this example include the UE 112, UE 113, and UE 114. The broadcast data may include aggregate data received from multiple UEs of the BUDC group (not shown), such as aggregate sensor information.

At 560, the SC-UE 420 and the UE 112 of the BUDC group exchange unicast data. The unicast data may include data packets relayed or routed by the SC-UE from other UEs of the BUDC group. In some cases, the unicast data includes aggregate data collected from multiple other UEs of the BUDC group (not shown). At 565, the SC-UE 420 and the UE 113 of the BUDC group exchange unicast data. Similarly, the unicast data may include data packets relayed or routed by the SC-UE from other UEs of the BUDC group.

At 570, the base station 121 and the UE 113 of the BUDC group exchange control-plane information or data through the primary cell of the base station 121. As noted, the base station 121 provides control-plane signaling and user-plane data for UEs of the BUDC group as the primary cell. At 575, the SC-UE 420 and the UE 114 of the BUDC group exchange unicast data. At 580, the base station 121 and the UE 114 of the BUDC group exchange control-plane information or data through the primary cell of the base station 121.

Figure 6:
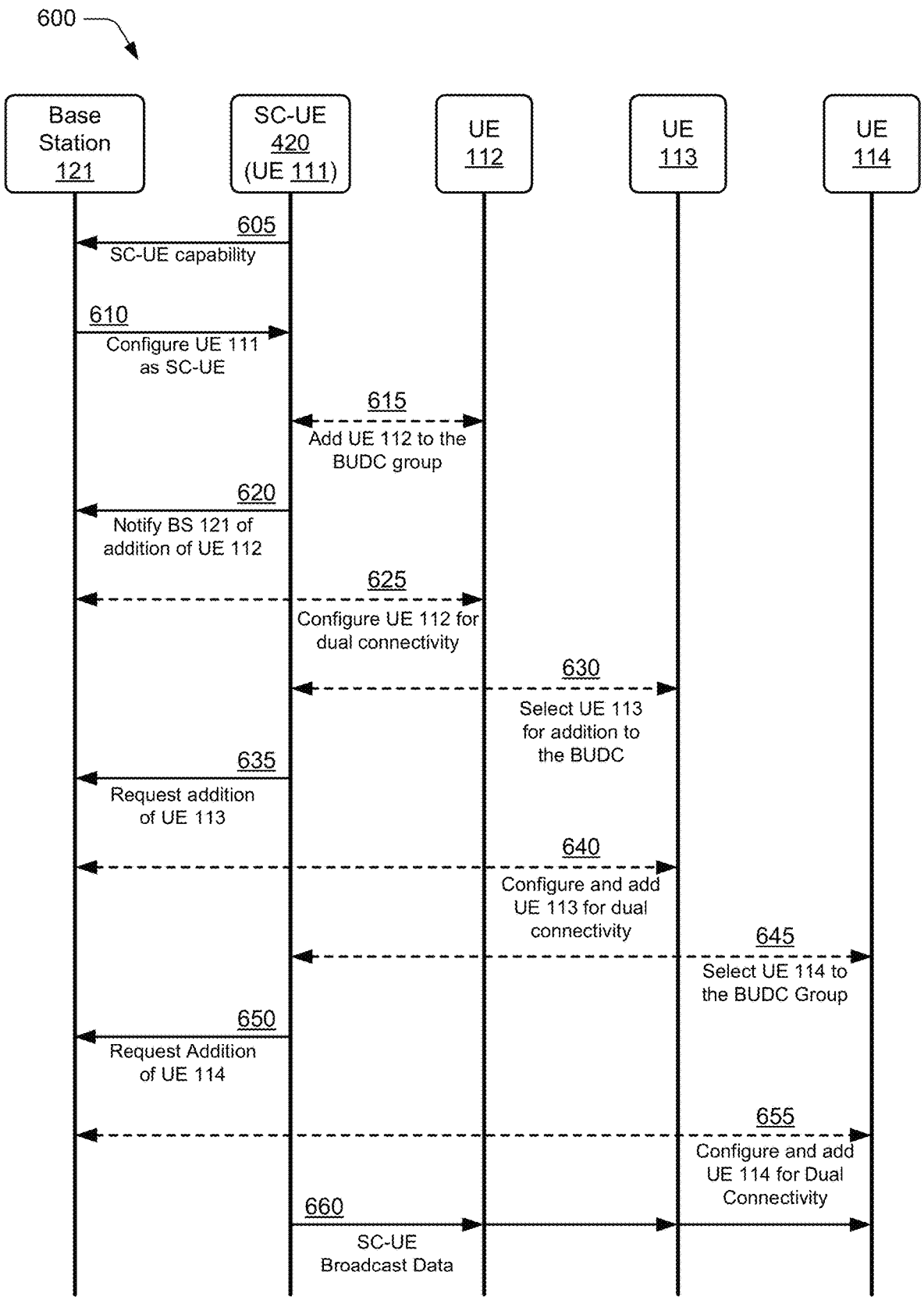
FIG. 6 illustrates an example of transactions between a secondary cell-user equipment and other user equipment to form a base station-user equipment dual connectivity group in accordance with one or more aspects.

FIG. 6 illustrates an example of transactions at 600 between a secondary cell-user equipment and other user equipment in accordance with aspects of dual connectivity with secondary cell-user equipment. The base station 121 and the UEs 111 through 114 may be implemented similar to the entities described with reference to FIGS. 1-4. Generally, the transactions of FIG. 6 are described in the context of the environment of FIG. 4 in which a base station 121 and SC-UE 420 provide dual connectivity through a primary cell and secondary cell, respectively.

At 605, the UE 111 provides an indication to the base station 121 of capabilities to act or assume the role of SC-UE for a BUDC group 410. This indication may include indicating that the UE 111 includes a secondary cell manager 220 for enabling SC-UE capabilities or providing the secondary cell for the BUDC group.

At 610, the base station 121 configures the UE 111 as the SC-UE 420 for the BUDC group 410. The base station 121 may grant resources of an air interface to the SC-UE 420 for the BUDC group or an encryption key for use in securing secondary cell communications among the UEs of the BUDC group.

At 615, the SC-UE 420 adds the UE 112 to the BUDC group. The SC-UE 420 may coordinate the addition of the UE 112 through a local wireless network connection, such as a Bluetooth™ or WLAN connection. For example, the SC-UE may provide to the UE 112, through the local wireless network connection, an identifier associated with the BUDC group or the encryption key for the secondary cell. At 620, the SC-UE 420 notifies the base station 121 that the UE 112 was added to the BUDC group. At 625, the base station 121 then configures the UE 112 for dual connectivity in the BUDC group. In some aspects, the base station 121 sends a layer-3 message to the UE 112 to configure the UE 114 for operation in the BUDC group.

At 630, the SC-UE 420 selects the UE 113 for addition to the BUDC group 410. The SC-UE can select the UE 113 for addition to the BUDC group based on any one or more of a use profile of the UE, an application of the UE (e.g., application layer communication with other UEs), a location of the UE, a proximity of the UE with the SC-UE, and/or a mobility state of the UE. At 635, the SC-UE 420 requests (or suggests), to the base station 121, the addition of the UE 113 to the BUDC group. At 640, the base station 121 configures the UE 113 for the BUDC group 410 and adds the UE 113 to the BUDC group for dual connectivity. The base station 121 can send a layer-3 message to the UE 113 to configure the UE 113 and direct the UE 113 to join the BUDC group.

At 645, the SC-UE 420 selects the UE 114 for addition to the BUDC group 410. The SC-UE can select the UE 114 for addition to the BUDC group based on any suitable criteria, such as a location of the UE, a proximity of the UE with the SC-UE, and/or a mobility state of the UE. At 650, the SC-UE 420 also requests (or suggests), to the base station 121, the addition of the UE 114 to the BUDC group. At 655, the base station 121 then configures the UE 114 for the BUDC group 410 and adds the UE 114 to the BUDC group for dual connectivity. In some cases, the base station 121 sends a layer-3 message to the UE 114 to configure the UE 114 and direct the UE to join the BUDC group.

At 660, the SC-UE 420 broadcasts data to the member UEs 110 of the BUDC group, which in this example include the UE 112, UE 113, and UE 114. The broadcast data may include aggregate data received from multiple UEs of the BUDC group (not shown), such as aggregate sensor information that is useful to one or more of the member UEs of the BUDC group.

Example Methods

Example methods 700 through 900 are described with reference to FIGS. 7-9 in accordance with one or more aspects of dual connectivity with secondary cell-user equipment. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
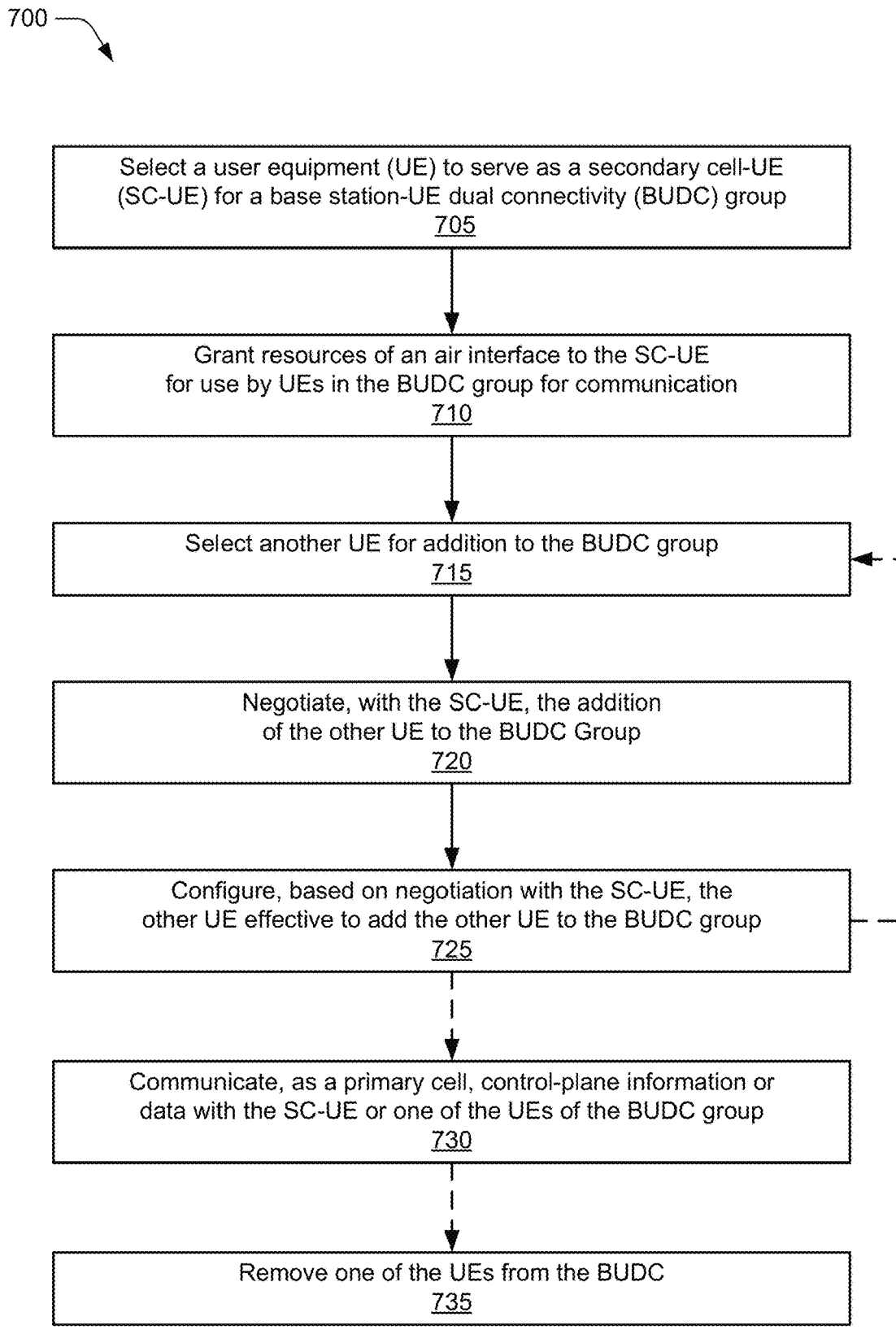
FIG. 7 illustrates an example method for forming a base station-user equipment dual connectivity group in accordance with one or more aspects.

FIG. 7 illustrates an example method 700 for forming a base station-user equipment dual connectivity (BUDC) group in accordance with one or more aspects. In some implementations, operations of the method 700 are performed by a BUDC group coordinator 268 of a base station 120. Alternately or additionally, the operations of the method 700 can be implemented by or with other entities described herein, such as the secondary cell manager 220 of the UE 110.

At 705, a user equipment (UE) is selected to serve as a secondary cell-UE (SC-UE) for a BUDC group. The selection of the UE may be made based on an indication or information that the UE includes capabilities to serve as the SC-UE for the BUDC. For example, a base station may poll multiple UEs to determine which UEs of a primary cell are capable of serving or acting as the SC-UE. As such, the base station may receive an indication or information from a UE indicating that the UE includes SC-UE capabilities or has sufficient resources (e.g., battery capacity or processing power) available to act as the SC-UE. Alternately or additionally, the UE can be selected based on location, proximity, and/or mobility with respect to one or more candidate UEs for the BUDC group or the base station.

At 710, resources of an air interface are granted to the SC-UE for use by UEs of the BUDC group for communication. By so doing, the base station can specify the frequency resources used by the SC-UE to communicate with other UEs of BUDC group. In some cases, the base station provides an SPS grant of the resources to the SC-UE, which can then use these resources to schedule communication with subordinate UEs in a secondary cell. The connection in the secondary cell between the SC-UE and other UEs of the BUDC group may use a 5G RAT or 6G. Alternately or additionally, the secondary connection may utilize a licensed frequency band, an unlicensed frequency band, and/or shared spectrum, such as CBRS.

At 715, another UE is selected for addition to the BUDC group. The base station can select the UE for the BUDC group based on any one or more of a use profile of the UE, an application of the UE (e.g., application layer communication with other UEs), a location of the UE, a proximity of the UE with the SC-UE, and/or a mobility state of the UE. Alternately or additionally, the SC-UE of the BUDC group can also allow other UEs to enter the group, such as by autonomously allowing the UE or requesting that the base station add a particular UE as suggested by the SC-UE.

At 720, the addition of the UE to the BUDC group is negotiated with the SC-UE of the BUDC group. For example, the base station can send a message to the SC-UE requesting addition of the selected UE to the BUDC group. The SC-UE may accept this request to add the UE to the BUDC group or decline the request, such as when available battery power of the SC-UE is limited, or processing resources of the SC-UE are taxed.

At 725, the UE selected for addition to the BUDC group is configured based on the negotiation with the SC-UE. The base station can send a layer-3 message to the selected UE to configure the selected UE and direct the UE to join the BUDC group. In some cases, the base station also provides an encryption key to the UE for use in secure communications in the secondary cell of the BUDC group. Optionally, from operation 725, the method 700 may return to operation 715 to perform additional iterations in which one or more other UEs are added to the BUDC group.

Optionally at 730, control information or data is communicated with the SC-UE or one of the UEs of the BUDC group. The communications between the base station and the SC-UE or UE may be uplink communications (i.e., transmission from the SC-UE and/or UE to the base station), downlink communications (i.e., transmission from the base station to the SC-UE and/UE), or both. As described herein, the control-plane for each dual-connectivity UE of the BUDC group may come from one or more base stations. With respect to the data-plane, the data-plane communications can come from the SC-UE (e.g., secondary cell) and/or the base stations (e.g., primary cell).

Optionally at 735, one of the UEs is removed from the BUDC group. In some cases, the UE is selected for removal when membership of the BUDC group is reviewed or a state of the UE changes with respect to the BUDC group or the SC-UE. For example, the UE may be selected for removal responsive to a change in one of the location of the UE, the proximity of the UE with the SC-UE, or the mobility state of the UE. Alternately or additionally, the base station can send a layer-2 message or layer-3 message to the UE to direct the UE to leave the BUDC group.

Figure 8:
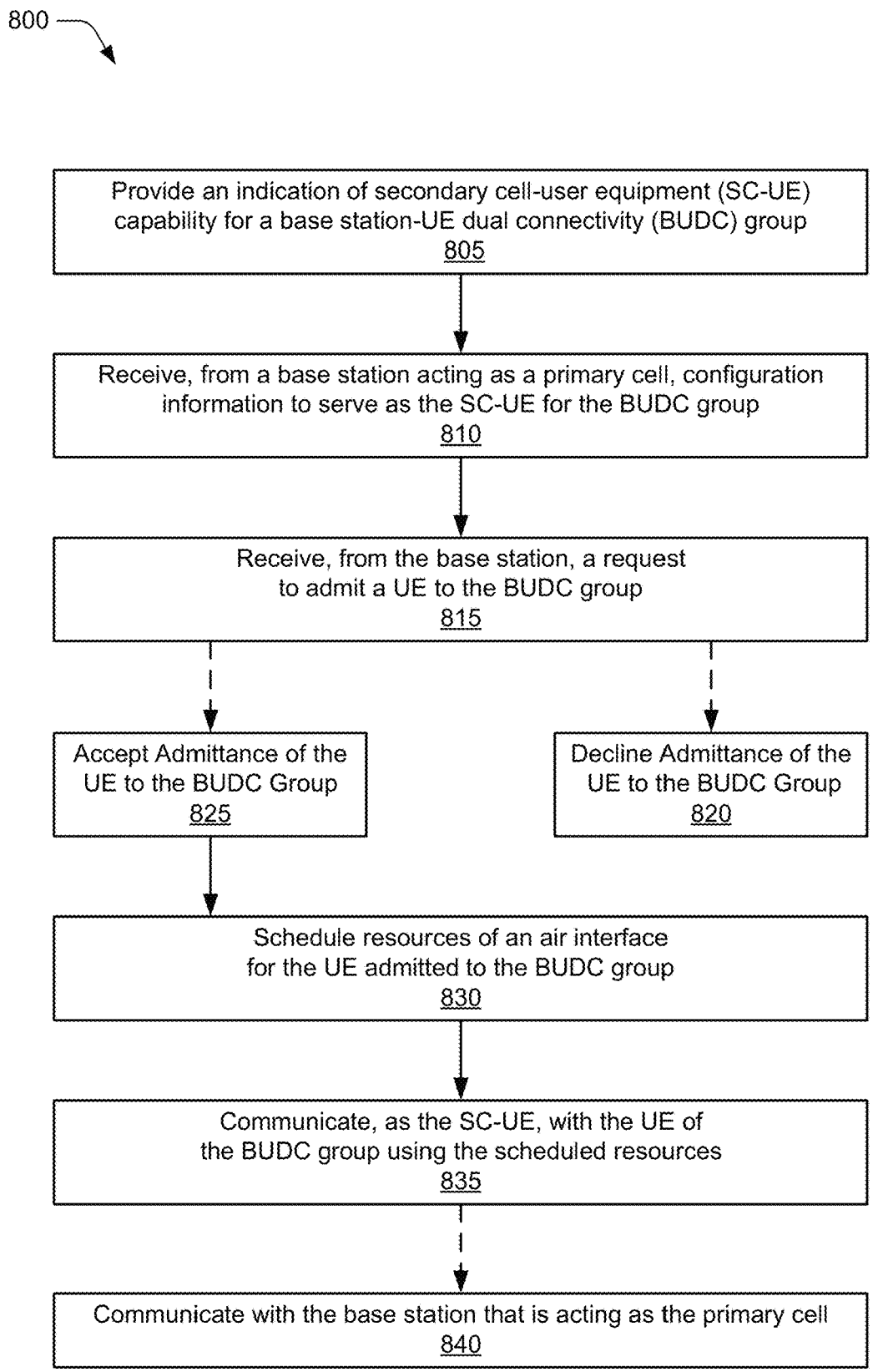
FIG. 8 illustrates an example method for admitting user equipment to a base station-user equipment dual connectivity group in accordance with one or more aspects.

FIG. 8 illustrates an example method 800 for admitting user equipment to a base station-user equipment dual connectivity (BUDC) group. In some aspects, operations of the method 800 are implemented by or with a secondary cell manager 220 of a UE 110. Alternately or additionally, the operations of the method 800 can be implemented by other entities described herein, such as another UE or a base station associated with a BUDC group 410.

At 805, a UE provides in indication for secondary cell-user equipment (SC-UE) capability for a BUDC group. This indication may include indicating that the UE 111 includes a secondary cell manager 220 for enabling SC-UE capabilities or providing the secondary cell for the BUDC group.

At 810, configuration information to serve as SC-UE for a BUDC group is received from a base station acting as a primary cell. In some cases, the base station provides an SPS grant of the resources to the SC-UE, which can then use these resources to schedule communication with subordinate UEs in a secondary cell. The connection in the secondary cell between the SC-UE and other UEs of the BUDC group may use a 5G RAT or 6G. Alternately or additionally, the secondary connection may utilize a licensed frequency band, an unlicensed frequency band, and/or shared spectrum, such as CBRS.

At 815, a request is received from the base station to admit a UE to the BUDC group. The request may identify the UE that the base station has selected for addition to the BUDC group. Alternately or additionally, the SC-UE can also allow another UE to enter the group, such as by allowing the UE autonomously or requesting that the base station add a particular UE as suggested by the SC-UE.

Optionally at 820, the SC-UE declines the request of the base station to admit the UE to the BUDC group. For example, the SC-UE may decline the request to add the UE in response to determining that the SC-UE lacks sufficient battery power or processing overhead to manage another UE in the BUDC group. Optionally at 825, the SC-UE accepts the request of the base station to admit the UE to the BUDC group. To do so, the SC-UE may reply to the base station indicating acceptance of the request to add the UE to the BUDC group.

At 830, resources of an air interface are scheduled for the UE admitted to the BUDC group. As described herein, the SC-UE can schedule, for the UE, uplink and/or downlink resources assigned to the SC-UE for communication in the secondary cell of the BUDC group. In some cases, the SC-UE also transmits synchronization pilots and other reference signals to enable the UE to synchronize with the SC-UE for communication in the secondary cell.

At 835, the SC-UE communicates with the UE using the scheduled resources of the air interface in the secondary cell. The communications between the SC-UE and the UE may be uplink communications (i.e., transmission from the UE to the SC-UE), downlink communications (i.e., transmission from the SC-UE to the UE), or both. The secondary cell associated with the SC-UE may include a data radio bearer for each corresponding UE in the BUDC group. Generally, the SC-UE can perform up to layer-2 messaging and communicate data packets for the UEs in the BUDC group. For example, the SC-UE can forward or send packets from one UE to another UE of the BUDC group based on a respective MAC ID or RNTI of each UE. In such cases, the SC-UE may implement a MAC ID or RNTI routing table or map for data traffic among the UEs of the BUDC group. For instance, one UE to which data packets are routed may act as data master, aggregator, or modifier for an application executing on one or more of the UEs of the BUDC group. Alternately or additionally, the SC-UE may perform data packet filtering based on a MAC ID of the UE or use RNTI mapping and routing for exchanging data packets with the UE.

Optionally at 840, the SC-UE communicates with the base station that is acting as the primary cell. For example, the SC-UE may communicate with the primary cell of the base station to access data or resources of the wireless network for which the base station serves as the primary cell. Additionally, the control-plane for the SC-UE of the BUDC group may come from the base station while the SC-UE serves to support the data-plane of the secondary cell.

Figure 9:
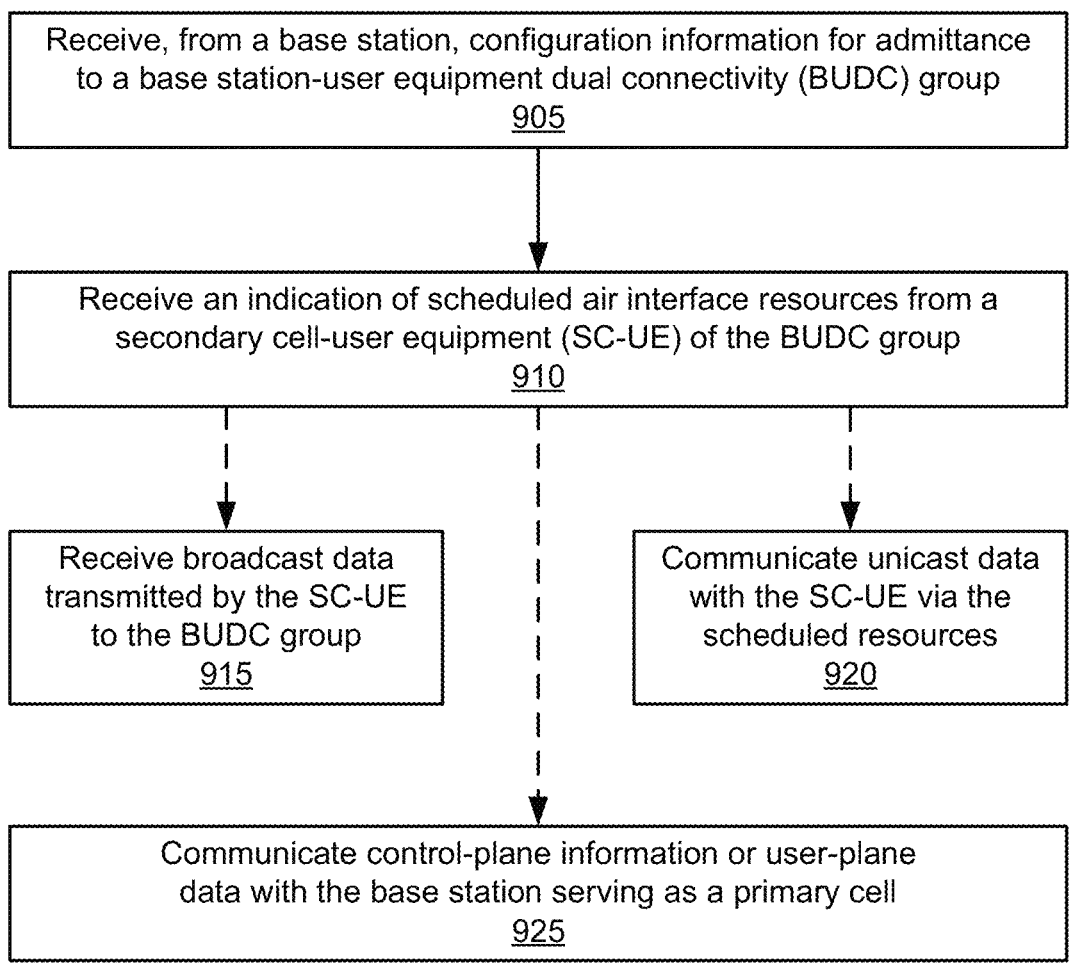
FIG. 9 illustrates an example method for communicating with a base station of a primary cell and secondary cell-user equipment of a dual connectivity group.

FIG. 9 illustrates an example method 900 for communicating with a base station of a primary cell and secondary cell-user equipment of a dual connectivity (BUDC) group. In some aspects, operations of the method 900 are implemented by or with a UE 110 of a BUDC group. Alternately or additionally, the operations of the method 900 can be implemented by other entities described herein, such as another UE associated with a BUDC group 410.

At 905, configuration information for admittance to a BUDC group is received from a base station. The configuration information may be received through a layer-3 message from the base station, which provides control-plane signaling and user-plane data to the UE as a primary cell.

At 910, an indication of scheduled air interface resources is received from a secondary cell-user equipment (SC-UE) of the BUDC group. The SC-UE may provide the indication of scheduled resources through a layer-2 message for a connection with a secondary cell of SC-UE or BUDC group. In some cases, the UE synchronizes with the SC-UE based on synchronization pilots and other reference signals provided by the SC-UE for secondary cell communication.

Optionally at 915, the UE receives broadcast data that is transmitted by the SC-UE to UEs of the BUDC group. The UE receives the broadcast data from the SC-UE through the secondary cell of the BUDC group. In some cases, the broadcast data includes aggregate data and/or data received from other UEs of the BUDC group.

Optionally at 920, the UE communicates unicast data with the SC-UE via the scheduled resources of the air interface. The unicast data may be filtered to the UE based on a MAC ID of the UE or routed to the UE based on an RNTI of the UE. Optionally at 925, UE may also communicate control-plane information or user-plane data with the base station serving as the primary cell for the BUDC group.

Although aspects of dual connectivity with secondary cell-user equipment have been described in language specific to features and/or methods, the subject of the appended claims is not necessarily limited to the specific features or methods described. Rather, the specific features and methods are disclosed as example implementations of dual connectivity with secondary cell-user equipment, and other equivalent features and methods are intended to be within the scope of the appended claims. Further, various different aspects are described, and it is to be appreciated that each described aspect can be implemented independently or in connection with one or more other described aspects.

In the following, some examples are described:

Example 1: A method performed by a first user equipment (UE) configured as a secondary cell-user equipment (SC-UE) for a base station-user equipment dual connectivity (BUDC) group, the method comprising:

receiving, at the first UE and from a base station, configuration information for the BUDC group, the base station being a primary cell for UEs of the BUDC group;

admitting a second UE associated with the base station to the BUDC group;

scheduling, for the second UE, resources of an air interface for communication in a secondary cell provided by the first UE for the BUDC group; and communicating data with the second UE of the BUDC group using the resources of the air interface that are scheduled for communication in the secondary cell.

Example 2: The method of example 1, wherein the first UE communicates the data directly with the second UE of the BUDC group in the secondary cell.

Example 3: The method of example 1 or example 2, further comprising providing, by the first UE and to the base station, an indication of capabilities of the first UE to serve as the SC-UE for the BUDC group.

Example 4: The method of any of the preceding examples, further comprising:

receiving, by the first UE and from the base station, a request by the base station to admit the second UE to the BUDC group; and accepting, by the first UE, the request by the base station to admit the second UE to the BUDC group.

Example 5: The method of any of examples 1 to 3, further comprising:

discovering, by the first UE and prior to admittance, the second UE as a candidate for the BUDC group; and notifying, by the first UE, the base station of the admittance of the second UE by the first UE to the BUDC group.

Example 6: The method of example 5, wherein the first UE discovers the second UE as the candidate for the BUDC group through a local wireless network connection.

Example 7: The method of example 5 or example 6, further comprising determining, by the first UE, to add the second UE to the BUDC group based on a location of the second UE, proximity with the second UE, or a mobility state of the second UE.

Example 8: The method of any of the preceding examples, wherein the configuration information for the BUDC group received from the base station includes a BUDC group identifier, an indication of air interface resources available to the SC-UE for use in the secondary cell and/or an encryption key for secure communication within the BUDC group.

Example 9: The method of any of the preceding examples, wherein the secondary cell includes a data radio bearer for communication of data packets between the first UE configured as the SC-UE and the second UE of the BUDC group.

Example 10: The method of any of the preceding examples, wherein:
a first connection of the first UE with the base station in the primary cell includes control-plane information and user-plane data; and
a second connection of the first UE with the second UE in the secondary cell includes user-plane data.

Example 11: The method of any of the preceding examples, further comprising transmitting a synchronization signal, synchronization pilot, or reference signal to enable the second UE to synchronize a connection with the first UE in the secondary cell.

Example 12: The method of any of the preceding examples, wherein the BUDC group further comprises a third UE and the method further comprises:
receiving, by the first UE, data packets from the second UE of the BUDC group; and
transmitting, by the first UE, at least some of the data packets of the second UE to the third UE of the BUDC group.

Example 13: The method of example 12, wherein BUDC group further comprises a fourth UE, and the method further comprises:
receiving, by the first UE, other data packets from the fourth UE of the BUDC group;
aggregating the packets of the second UE and the other data packets of the fourth UE; and
transmitting, by the first UE, at least some of the aggregated data packets to the third UE of the BUDC group.

Example 14: The methods of example 12 or 13, further comprising:
filtering the data packets or other data packets for transmission to the third UE based on a respective medium access control (MAC) ID of the second UE, the third UE, or the fourth UE; or
routing the data packets or other data packets to the third UE based on a respective radio network temporary identifier (RNTI) of the second UE, the third UE, or the fourth UE.

Example 15: A method performed by a base station to establish a base station-user equipment dual connectivity (BUDC) group for multiple user equipment (UE), the method comprising:
selecting a first UE to serve as a secondary cell-user equipment (SC-UE) for the BUDC group, the base station being a primary cell for the first UE;
granting resources of an air interface to the first UE for use by UEs of the BUDC group to communicate in a secondary cell provided by the first UE;
configuring a second UE for addition to the BUDC group effective to enable the second UE to communicate with the first UE through the secondary cell; and
communicating, as the primary cell, control-plane information or user-plane data with the first UE or the second UE of the BUDC group.

Example 16: The method of example 15, further comprising configuring, by the base station, a third UE for addition to the BUDC group effective to enable the third UE to communicate with the first UE through the secondary cell.

Example 17: The method of example 15 or 16, further comprising reconfiguring, by the base station, the second UE effective to remove the second UE from the BUDC group.

Example 18: The method of any of examples 15 to 17, further comprising:
transmitting, to the first UE, a request to admit the second UE to the BUDC group;
receiving, from the first UE, a response indicating acceptance of the request by the base station to admit the second UE to the BUDC group; and
wherein configuring the second UE to add the second UE to the BUDC group is based on the response received from the first UE that is configured as the SC-UE.

Example 19: The method of any of examples 15 to 17, further comprising:
receiving, from the first UE, a request that the base station add the second UE to the BUDC group; and
wherein configuring the second UE to add the second UE to the BUDC group is based on the request received from the first UE that is configured as the SC-UE.

Example 20: The method of any of examples 15 to 19, further comprising receiving, from the first UE, a notification that the first UE has added a third UE to the BUDC group for dual connectivity.

Example 21: The method of any of examples 15 to 20, wherein the resources of the air interface are granted to the first UE through a semi-persistent scheduling (SPS) assignment or grant of the resources by the base station.

Example 22: The method of any of examples 15 to 18, 20 or 21, further comprising determining, by the base station, to add the second UE to the BUDC group based on a location of the second UE, proximity of the second UE with the first UE, or a mobility state of the second UE.

Example 23: A first user equipment (UE) comprising:
a radio frequency (RF) transceiver;
a processor and memory system coupled to the RF transceiver and comprising instructions that are executable by the processor to direct the first UE to perform the method or acts of any of examples 1 to 14.

Example 24: A base station comprising:
a radio frequency (RF) transceiver;
a processor and memory system coupled to the RF transceiver and comprising instructions that are executable by the processor to direct the base station to perform the method or acts of any of examples 15 to 22.

Example 25: A computer-readable medium comprising instructions that, when executed by a processor, cause an apparatus incorporating the processor to perform the method or acts of any of examples 1 to 22.

What is claimed is:
1. A method performed by a first user equipment (UE) for providing a secondary cell to one or more user equipments (UEs) in a base station-user equipment dual connectivity (BUDC) group, the method comprising:
receiving, at the first UE and from a base station serving as a primary cell to the first UE and the one or more UEs in the BUDC, configuration information for the first UE to serve as a secondary cell-user equipment (SC-UE) that provides the secondary cell for the one or more UEs in the BUDC group;
providing, by the first UE and to a second UE connected to the base station, access to the secondary cell for a secondary connection by admitting the second UE to the BUDC group;

scheduling, for the second UE, resources of an air interface for communication in the secondary cell provided by the first UE for the one or more UEs in the BUDC group; and
communicating data with the second UE in the BUDC group using the resources of the air interface that are scheduled for communication in the secondary cell.

2. The method of claim 1, wherein the communicating data comprises:
communicating directly with the second UE in the BUDC group using the secondary cell.

3. The method of claim 1, further comprising:
providing, by the first UE and to the base station, an indication of capabilities of the first UE to serve as the SC-UE that provides the secondary cell for the one or more UEs in the BUDC group.

4. The method of claim 1, wherein the providing access to the secondary cell comprises:
receiving, by the first UE and from the base station, a request by the base station to admit the second UE to the BUDC group.

5. The method of claim 1, wherein the providing access to the secondary cell comprises:
discovering, by the first UE and prior to admitting the second UE to the BUDC group, the second UE as a candidate for the BUDC group; and
notifying, by the first UE, the base station of the admitting of the second UE to the BUDC group.

6. The method of claim 5, further comprising:
determining, by the first UE, to add the second UE to the BUDC group based on a location of the second UE, proximity with the second UE, a local wireless connection with the second UE, or a mobility state of the second UE.

7. The method of claim 1, wherein receiving the configuration information further comprises:
receiving, as the configuration, one or more of:
a BUDC group identifier;
an indication of air interface resources available to the SC-UE for use in the secondary cell; or
an encryption key for secure communication within the BUDC group.

8. The method of claim 1, further comprising:
communicating control-plane information and user-plane data with the base station using a primary connection in the primary cell; and
communicating user-plane data with the second UE using the secondary connection in the secondary cell.

9. The method of claim 1, wherein the BUDC group further comprises a third UE and the method further comprises:
receiving, by the first UE, data packets from the second UE in the BUDC group; and
transmitting, by the first UE, at least some of the data packets of the second UE to the third UE in the BUDC group.

10. A method performed by a base station for providing a secondary cell to one or more user equipments (UEs) using a base station-user equipment dual connectivity (BUDC) group, the method comprising:
providing a primary connection through a primary cell to the one or more UEs;
selecting a first user equipment (UE) of the one or more UEs, to provide the secondary cell as a secondary cell-user equipment, SC-UE, for the BUDC group;
granting resources of an air interface to the first UE for scheduling a respective secondary connection within the secondary cell for at least of the one or more UEs admitted to the BUDC group;
configuring, via a primary connection with the first UE, the first UE with the granted resources of the air interface to serve as the SC-UE for the BUDC group;
configuring a second UE of the one or more UEs for addition to the BUDC group effective to enable the second UE to communicate with the first UE through the secondary cell and to communicate with the base station through the primary cell; and
communicating, as the primary cell, control-plane information or user-plane data with the first UE or the second UE.

11. The method of claim 10, wherein configuring a second UE for addition to the BUDC group comprises:
transmitting, to the first UE, a request to admit the second UE to the BUDC group; and
receiving, from the first UE, a response indicating acceptance of the request by the base station to admit the second UE to the BUDC group,
wherein configuring the second UE to add the second UE to the BUDC group is based on the response received from the first UE that is configured as the SC-UE for the BUDC group.

12. The method of claim 10, wherein configuring a second UE for addition to the BUDC group comprises:
receiving, from the first UE, a request that the base station add the second UE to the BUDC group,
wherein the configuring the second UE of the one or more UEs for addition to the BUDC group is based on the request received from the first UE that is configured as the SC-UE for the BUDC group.

13. The method of claim 10, further comprising:
receiving, from the first UE, a notification that the first UE has added a third UE to the BUDC group for dual connectivity.

14. The method of claim 10, further comprising:
granting the resources of the air interface to the first UE through a semi-persistent scheduling (SPS) assignment.

15. A user equipment comprising:
a radio frequency (RF) transceiver; and
a processor and memory system coupled to the RF transceiver, the memory system comprising instructions that are executable by the processor to direct the user equipment (UE) to perform operations for providing a secondary cell to one or more user equipments (UEs) in a base station-user equipment dual connectivity (BUDC) group, the operations comprising:
receiving, at the UE and from a base station serving as a primary cell to the first UE and the one or more UEs in the BUDC, configuration information for the first UE to serve as a secondary cell-user equipment (SC-UE) that provides the secondary cell for the one or more UEs in the BUDC group;
providing, by the UE and to a second UE connected to the base station, access to the secondary cell for a secondary connection by admitting the second UE to the BUDC group;
scheduling, for the second UE, resources of an air interface for communication in the secondary cell provided by the UE for the one or more UEs in the BUDC group; and
communicating data with the second UE in the BUDC group using the resources of the air interface that are scheduled for communication in the secondary cell.

16. The user equipment of claim 15, wherein the communicating data comprises:
   communicating directly with the second UE in the BUDC group using the secondary cell.

17. The user equipment of claim 15, wherein the memory system comprises instructions that are executable by the processor to direct the UE to perform operations comprising:
   providing, by the UE and to the base station, an indication of capabilities of the UE to serve as the SC-UE that provides the secondary cell for the one or more UEs in the BUDC group.

18. The user equipment of claim 15, wherein the providing access to the secondary cell comprises:
   receiving, by the UE and from the base station, a request by the base station to admit the second UE to the BUDC group.

19. The user equipment of claim 15, wherein the providing access to the secondary cell comprises:
   discovering, by the UE and prior to admitting the second UE to the BUDC group, the second UE as a candidate for the BUDC group; and
   notifying, by the UE, the base station of the admitting of the second UE to the BUDC group.

20. The user equipment of claim 15, wherein the memory system comprises instructions that are executable by the processor to direct the UE to perform operations comprising:
   communicating control-plane information and user-plane data with the base station using a primary connection in the primary cell; and
   communicating user-plane data with the second UE using the secondary connection in the secondary cell.

* * * * *